(12) United States Patent
Amano et al.

(10) Patent No.: US 8,087,789 B2
(45) Date of Patent: Jan. 3, 2012

(54) PROJECTION OPTICAL SYSTEM AND PROJECTION DISPLAY DEVICE

(75) Inventors: Ryuhei Amano, Hirakata (JP); Takashi Ikeda, Higashi-Osaka (JP); Shinichi Okuno, Hirakata (JP); Osamu Nagase, Hanamaki (JP); Yoshitsugu Kohno, Hanamaki (JP)

(73) Assignees: Sanyo Electric Co., Ltd., Moriguchi-shi (JP); Ricoh Optical Industries Co., Ltd., Hanamaki (JP)

( * ) Notice: Subject to any disclaimer, the term of this patent is extended or adjusted under 35 U.S.C. 154(b) by 509 days.

(21) Appl. No.: 12/330,617

(22) Filed: Dec. 9, 2008

(65) Prior Publication Data

US 2009/0153809 A1 Jun. 18, 2009

(30) Foreign Application Priority Data

Dec. 14, 2007 (JP) .................. 2007-323415

(51) Int. Cl.
  *G03B 21/12* (2006.01)
  *G03B 21/28* (2006.01)
  *G03B 27/18* (2006.01)
(52) U.S. Cl. ......................... 353/99; 359/730
(58) Field of Classification Search .............. 353/99, 353/73, 78, 51; 359/727, 730
See application file for complete search history.

(56) References Cited

U.S. PATENT DOCUMENTS

| | | | | |
|---|---|---|---|---|
| 4,765,733 A * | 8/1988 | Negishi | ............................. | 353/99 |
| 5,748,377 A * | 5/1998 | Matsumoto et al. | .......... | 359/633 |
| 6,752,500 B1 * | 6/2004 | Yoshii et al. | .................... | 353/78 |
| 6,779,897 B2 * | 8/2004 | Konno et al. | .................... | 353/99 |
| 6,829,099 B2 * | 12/2004 | Kato et al. | ..................... | 359/650 |
| 7,896,504 B2 * | 3/2011 | Sacre et al. | ...................... | 353/78 |
| 7,909,471 B2 * | 3/2011 | Noji | ................................. | 353/77 |
| 7,922,336 B2 * | 4/2011 | Yokoyama et al. | ............. | 353/71 |
| 2003/0067691 A1 * | 4/2003 | Kurematsu et al. | ........... | 359/728 |
| 2004/0233398 A1 * | 11/2004 | Konno et al. | ................... | 353/99 |
| 2006/0109427 A1 * | 5/2006 | Konno et al. | ................... | 353/78 |
| 2006/0164605 A1 * | 7/2006 | Kuwa | .............................. | 353/78 |
| 2007/0258056 A1 * | 11/2007 | Noji | ................................ | 353/78 |
| 2008/0218706 A1 * | 9/2008 | Adachi et al. | ................... | 353/98 |
| 2009/0015801 A1 * | 1/2009 | Takaura et al. | ................ | 353/99 |
| 2009/0122279 A1 * | 5/2009 | Minefuji | ......................... | 353/99 |
| 2009/0153809 A1 * | 6/2009 | Amano et al. | .................. | 353/99 |
| 2009/0168031 A1 * | 7/2009 | Imaoka et al. | ................. | 353/99 |
| 2009/0231555 A1 * | 9/2009 | Nagarekawa et al. | ......... | 353/99 |

FOREIGN PATENT DOCUMENTS

| | | |
|---|---|---|
| JP | 05-100312 A | 4/1993 |
| JP | 2006-235516 A | 9/2006 |

* cited by examiner

*Primary Examiner* — John Lee

(74) *Attorney, Agent, or Firm* — Marvin A. Motsenbocker; Mots Law, PLLC

(57) ABSTRACT

A projection optical system includes a first refracting optical system having a plurality of lenses, a first reflecting optical system, and a second reflecting optical system. The first reflecting optical system is disposed on a side of a projection port with respect to an optical axis of the first refracting optical system, and has a positive optical power to reflect light incident through the first refracting optical system in a direction opposite to the side of the projection port. The second reflecting optical system is operable to reflect the light reflected on the first reflecting optical system toward the projection port.

15 Claims, 6 Drawing Sheets

PROJECTION OPTICAL SYSTEM AND PROJECTION DISPLAY DEVICE

This application claims priority under 35 U.S.C. Section 119 of Japanese Patent Application No. 2007-323415 filed Dec. 14, 2007, entitled "PROJECTION OPTICAL SYSTEM AND PROJECTION DISPLAY DEVICE".

BACKGROUND OF THE INVENTION

1. Field of the Invention

The present invention relates to a projection optical system for enlarging and displaying an image on an imager onto a projection plane, and a projection display device incorporated with the projection optical system, and more particularly to an arrangement suitable for use in a projection display device for projecting projection light onto a projection plane in an oblique direction.

2. Disclosure of Related Art

A projection display device (hereinafter, called as a "projector") for enlarging and projecting an image on an imager such as a liquid crystal panel onto a projection plane (such as a screen) has been commercialized, and widely spread. As an example of the projector of the above type, there has been proposed a projector incorporated with a wide-angle projection optical system, and having an arrangement for tilting a propagating direction of projection light with respect to an optical axis of the projection optical system for tilt projection, in order to shorten a distance between a screen and a projector main body.

For instance, there is known a projector incorporated with a wide-angle lens having a large angle of view, as a projection optical system. In the projector, the throw distance can be shortened, and tilt projection free of distortion is realized by shifting an imager and a screen in directions away from each other with respect to an optical axis of the projection optical system. The projector, however, requires a wide-angle lens having a large angle of view. Accordingly, the size of the projector main body may be increased, as the size of the lens is increased.

There is proposed a projector incorporated with a projection lens unit and a mirror, as a projection optical system. In the projector, the throw distance can be shortened by: forming an image on an imager, as an intermediate image, at a position between the projection lens unit and the mirror; and enlarging and projecting the intermediate image by the mirror. According to the projector, a wide angle projection is realized with use of a mirror having a relatively small curved surface. This enables to suppress increasing the size of the projector main body.

In the case where a device incorporated with a projection lens system and a reflection mirror, as recited in the latter arrangement, is fabricated as a product, the device may have an arrangement as shown in e.g. FIG. 6.

Specifically, an optical engine 510a is housed in a casing 510, and the optical engine 510a is operable to generate light (hereinafter, called as "modulated image light") which is modulated in accordance with an image signal. An imager for generating modulated image light is disposed at such a position that a center of an effective display area of the imager is displaced on the upper side with respect to an optical axis L1 of a lens unit 520, in other words, on the side of a window 540a formed in an upper surface of a cover member 540, by a predetermined distance "d". Modulated image light through the imager is incident onto the lens unit 520. The modulated image light through the lens unit 520 is convergently reflected on a reflection mirror 530.

The reflection mirror 530 has a concave reflecting surface of an aspherical shape or a free curve shape. The reflection mirror 530 is disposed on the lower side (opposite to the window 540a) with respect to the optical axis L1 of the lens unit 520. Modulated image light reflected on the reflection mirror 530 is transmitted through the window 540a formed in the upper surface of the cover member 540, and projected onto a screen plane as wide-angle light.

In the above arrangement, as shown in FIG. 6, a portion of the cover member 540, corresponding to the reflection mirror 530, is projected downwardly by a significant length. Accordingly, a large step portion G is likely to be defined between a lower end of the projecting portion, and a bottom surface of the lens unit 520. A leg portion 550 is formed on a bottom surface of the casing 510 or a like member to compensate for the step portion G. However, the projector having the above arrangement is likely to be unstably sit, when being sit on the table as shown in FIG. 6.

SUMMARY OF THE INVENTION

A projection optical system according to a first aspect of the invention includes a first refracting optical system having a plurality of lenses; a first reflecting optical system having a positive optical power and disposed on a side of a projection port with respect to an optical axis of the first refracting optical system to reflect light incident through the first refracting optical system in a direction opposite to the side of the projection port; and a second reflecting optical system for reflecting the light reflected on the first reflecting optical system toward the projection port.

In the projection optical system according to the first aspect, the first reflecting optical system is disposed on the side of the projection port. Accordingly, unlike the arrangement shown in FIG. 6, there is no likelihood that a large step portion may be defined at a portion of the projector on the side opposite to the projection port. Therefore, the projection optical system (i.e. a projection display device) can be stably sit when being sit on the table.

A projection display device according to a second aspect of the invention includes a projection optical system for enlarging and projecting an image on an imager onto a projection plane. The projection optical system includes a first refracting optical system having a plurality of lenses; a first reflecting optical system having a positive optical power and disposed on a side of a projection port with respect to an optical axis of the first refracting optical system to reflect light incident through the first refracting optical system in a direction opposite to the side of the projection port; and a second reflecting optical system for reflecting the light reflected on the first reflecting optical system toward the projection port.

In the projection display device according to the second aspect, a similar merit as in the projection optical system according to the first aspect can be obtained.

BRIEF DESCRIPTION OF THE DRAWINGS

These and other objects, and novel features of the present invention will become more apparent upon reading the following detailed description of the embodiments along with the accompanying drawings.

Figure 1:
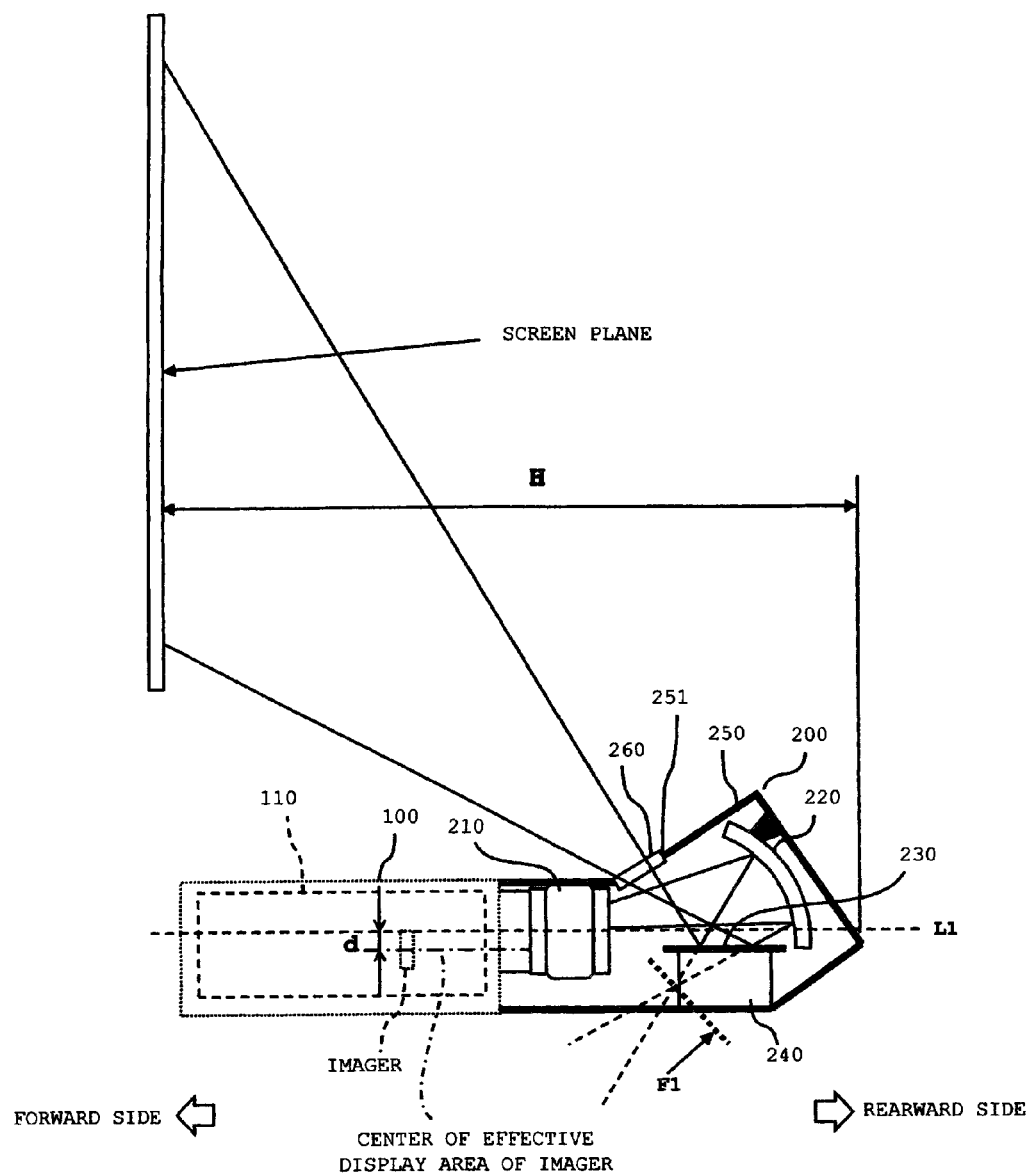
FIG. 1 is a diagram showing an arrangement of a projector in accordance with a first embodiment of the invention.

The drawings are provided mainly for describing the present invention, and do not limit the scope of the present invention.

DESCRIPTION OF PREFERRED EMBODIMENTS

In the following, embodiments of the invention are described referring to the drawings.

First Embodiment

FIG. 1 is a diagram showing an arrangement of a projector in accordance with the first embodiment. As shown in FIG. 1, the projector includes a casing 100 and a projection optical system 200. The projection optical system 200 has a lens unit 210, a first reflection mirror 220, a second reflection mirror 230, a support portion 240, a cover member 250, and a protection filter 260.

An optical engine 110 is housed in the casing 100. The optical engine 110 is operable to generate image light which is modulated in accordance with an image signal. The lens unit 210 is constituted of a plurality of lenses. Modulated image light generated in the optical engine 110 is incident onto the lens unit 210. In this embodiment, an imager for generating modulated image light is disposed at such a position that a center of an effective display area of the imager is displaced on the lower side with respect to an optical axis L1 of the lens unit 210 by a predetermined distance "d".

The first reflection mirror 220 has a concave reflecting surface of an aspherical shape or a free curve shape, and has a positive optical power. The first reflection mirror 220 is disposed on the side opposite to the center of the effective display area of the imager for generating modulated image light, i.e. on the upper side with respect to the optical axis L1 of the lens unit 210. The modulated image light through the lens unit 210 is convergently reflected toward the optical axis L1 by the first reflection mirror 220.

The second reflection mirror 230 has a flat plate-like shape; and is disposed on the side of the first reflection mirror 220 with respect to a convergence plane F1 (position where the cross section of a light flux is minimized) where the modulated image light reflected on the first reflection mirror 220 is converged, and at an upper position with respect to a lower end of the lens unit 210. The second reflection mirror 230 is fixed on the support portion 240 in such a manner that a reflecting surface of the second reflection mirror 230 is aligned substantially in parallel to the optical axis L1 of the lens unit 210, and intersects substantially perpendicularly to a screen plane (projection plane).

As the second reflection mirror 230 is disposed closer to the convergence plane F1, the size of the second reflection mirror 230 can be reduced. In view of this, it is preferable to dispose the second reflection mirror 230 closer to the convergence plane F1. However, as the second reflection mirror 230 is disposed closer to the convergence plane F1, the second reflection mirror 230 approaches the lens unit 210. As a result, modulated image light reflected on the second reflection mirror 230 may be blocked by the lens unit 210. In view of this, generally, the second reflection mirror 230 is disposed at an intended position between the first reflection mirror 220 and the convergence plane F1 to properly guide modulated image light reflected on the second reflection mirror 230 to the screen without being blocked by the lens unit 210. As long as modulated image light reflected on the second reflection mirror 230 is not blocked by the lens unit 210, the second reflection mirror 230 may be disposed on the convergence plane F1. As shown in FIG. 1, disposing the second reflection mirror 230 at an upper position with respect to the lower end of the lens unit 210 enables to set a bottom surface of the cover member 250 at a position closer to the direction of the optical axis L1 from a position flush with a bottom surface of the casing 100, as necessary.

The cover member 250 is adapted to house the lens unit 210, the first reflection mirror 220, the second reflection mirror 230, and the support portion 240. A window 251 is formed in an upper surface of the cover member 250, at a position where modulated image light reflected on the second reflection mirror 230 is transmitted. The bottom surface of the cover member 250 is substantially flush with the bottom surface of the casing 100. The protection filter 260 is provided on the window 251 to prevent intrusion of dusts and the like.

In assembling the parts into a projector, the lens unit 210 is connected to the optical engine 110, and the cover member 250 is mounted on the casing 100. Thereby, the projection optical system 200 and the casing 100 are assembled as one unit. Modulated image light generated in the optical engine 110 is emitted from the lens unit 210, and convergently reflected on the first reflection mirror 220. The modulated image light reflected on the first reflection mirror 220 is reflected on the second reflection mirror 230. Thereafter, the modulated image light intersects an optical path of modulated image light directing from the lens unit 210 toward the first reflection mirror 220, and is projected onto the screen plane (projection plane) disposed at an upper forward position of the projector through the window 251.

Examples of the imager to be disposed in the optical engine 110 are a reflective liquid crystal panel and an MEMS device, in addition to a transmissive liquid crystal panel.

Figure 2:
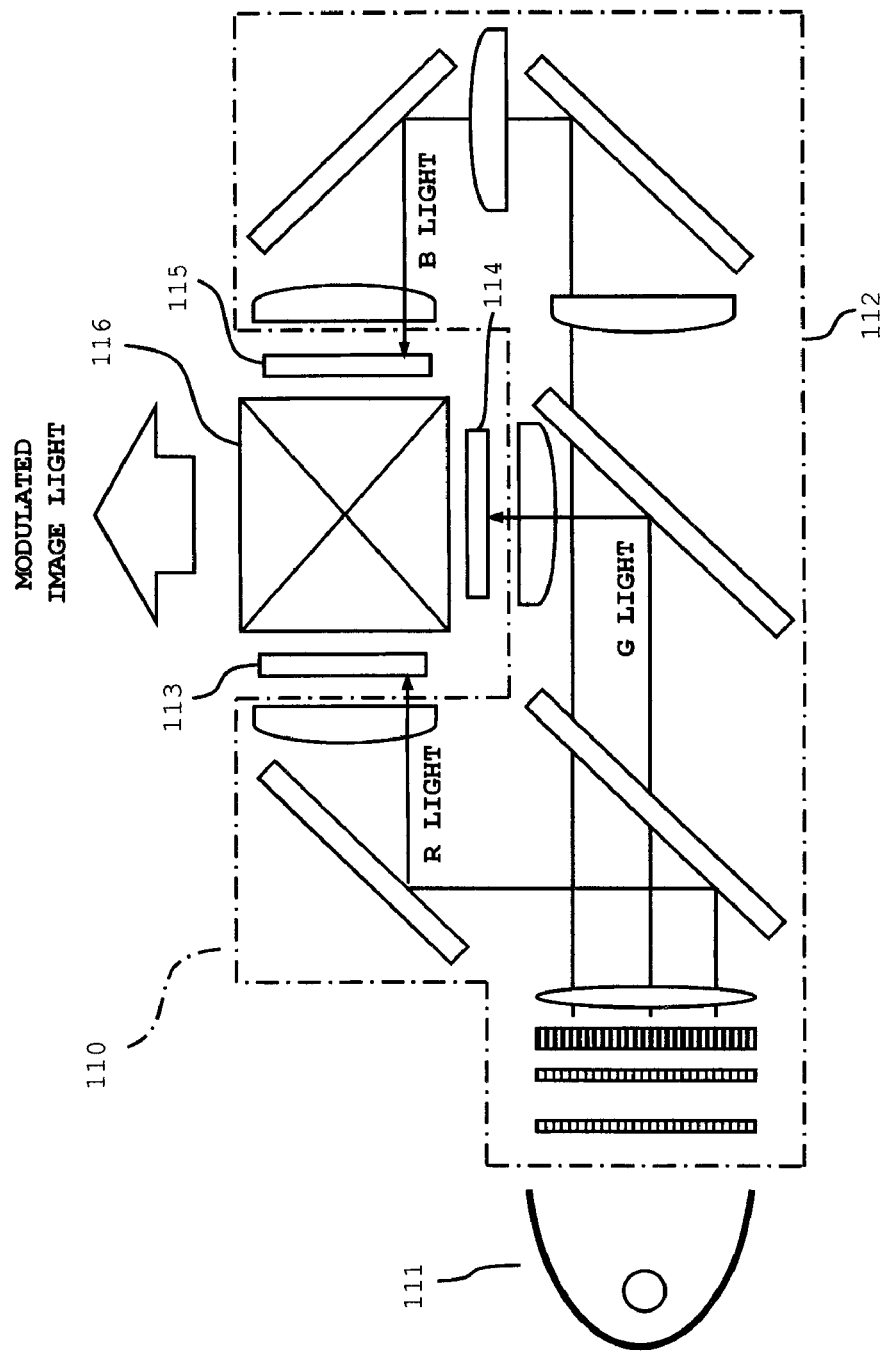
FIG. 2 is a diagram showing an arrangement example of an optical engine in the first embodiment.

FIG. 2 is a diagram showing an arrangement example of the optical engine 110, in the case where a transmissive liquid crystal panel is used as an imager.

White light emitted from a light source 111 is separated into light (hereinafter, called as "R light") of a red wavelength band, light (hereinafter, called as "G light") of a green wavelength band, and light (hereinafter, called as "B light") of a blue wavelength band by a light guiding optical system 112 for illuminating liquid crystal panels 113, 114, and 115, respectively. R light, G light, and B light which have been modulated by the liquid crystal panels 113, 114, and 115 is combined by a dichroic prism 116 for incidence onto the lens unit 210 as modulated image light.

FIGS. 3A through 3D are diagrams showing examples, wherein the projector in accordance with the first embodiment is sit on the table.

In this embodiment, the first reflection mirror 220 is disposed on the side of the upper surface of the cover member 250 (on the side of the window 251) with respect to the optical axis L1 of the lens unit 210. Modulated image light converged on the first reflection mirror 220 is reflected on the second reflection mirror 230, and is projected onto the screen plane through the window 251 formed in the upper surface of the cover member 250. In this arrangement, there is no need of arranging the first reflection mirror 220 on the side of the bottom surface of the cover member 250 (on the side opposite to the window 251) with respect to the optical axis L1 of the lens unit 210.

The above arrangement eliminates a likelihood that a portion of the bottom surface of the cover member 250, corresponding to the first reflection mirror 220 disposed on the side of the bottom surface of the cover member 250, may be projected downwardly by a significant length, with the result that a large step portion may be defined at the bottom surface of the cover member 250 (i.e. the projection optical system 200) Accordingly, as shown in FIGS. 3A through 3D, the projector can be stably sit, when being sit on the table.

Figure 3A:
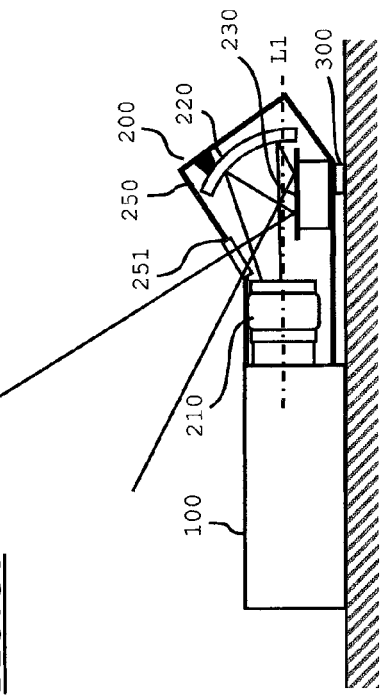
FIG. 3A is a diagram showing an example, wherein the projector in accordance with the first embodiment is sit on the table.

In this embodiment, as shown in FIG. 3A, the bottom surfaces of the casing 100 and the cover member 250 are directly contacted with a sit plane. Alternatively, the modification arrangements as shown in FIGS. 3B through 3D may be proposed.

Figure 3B:
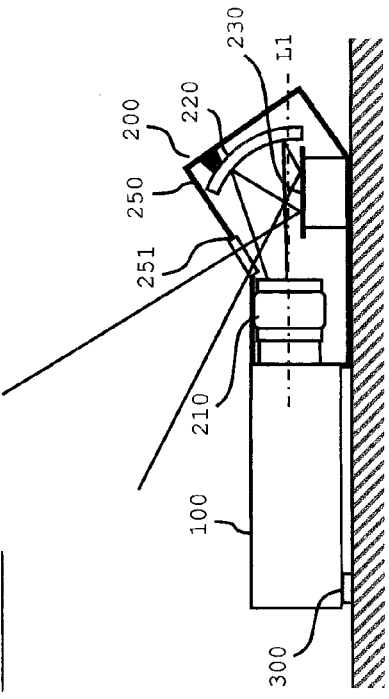
FIG. 3B is a diagram showing an example, wherein a projector as a modification of the first embodiment is sit on the table.

In the modification shown in FIG. 3B, a leg portion 300 is formed at each of a bottom surface of a casing 100, and a bottom surface of a cover member 250 (i.e. the projection optical system 200). This arrangement enables to define a slight clearance between the bottom surfaces of the casing 100 and the cover member 250, and a sit plane. In this arrangement, the leg portion 300 is formed at four corners on a bottom surface of a projector.

Figure 3C:
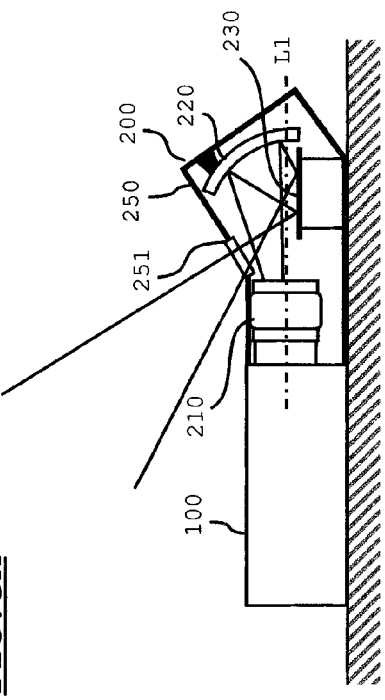
FIG. 3C is a diagram showing an example, wherein a projector as another modification of the first embodiment is sit on the table.

In the modification shown in FIG. 3C, a bottom surface of a cover member 250 is set to a position slightly higher than a bottom surface of a casing 100, and a leg portion 300 is formed at the bottom surface of the cover member 250. This enables to define a slight clearance between the bottom surface of the cover member 250, and a sit plane. In this arrangement, the leg portion 300 is formed at e.g. two positions opposite to each other with respect to an optical axis of a lens unit 210.

Figure 3D:
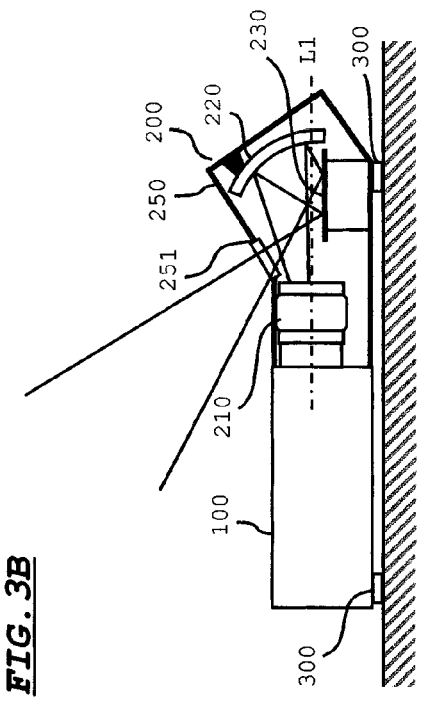
FIG. 3D is a diagram showing an example, wherein a projector as yet another modification of the first embodiment is sit on the table.

In the modification shown in FIG. 3D, a bottom surface of a casing 100 is set to a position slightly higher than a bottom surface of a cover member 250, and a leg portion 300 is formed at the bottom surface of the casing 100. This enables to define a slight clearance between the bottom surface of the casing 100, and a sit plane. In this arrangement, the leg portion 300 is formed at e.g. two positions opposite to each other with respect to an optical axis of a lens unit 210.

Figure 6:
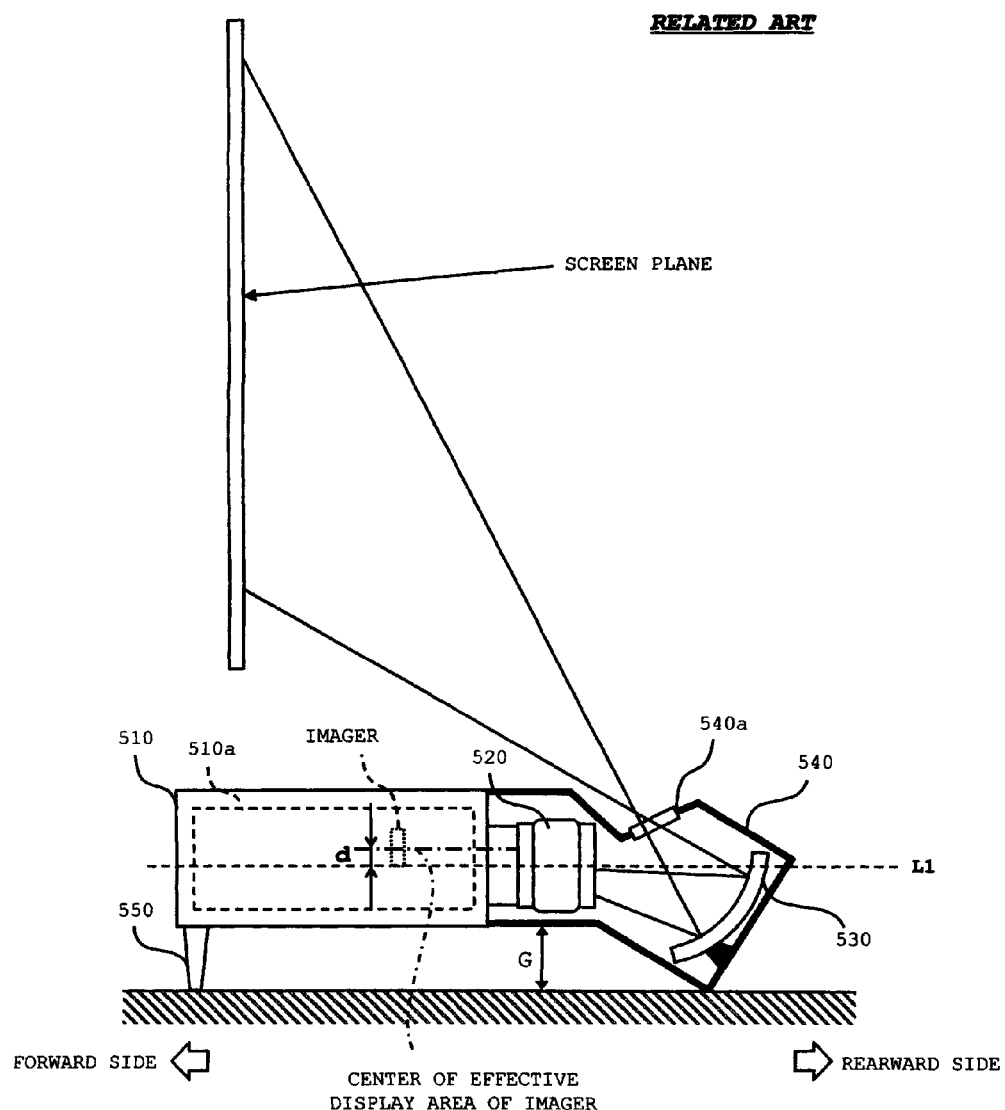
FIG. 6 is a diagram showing an arrangement of a projector of related art.

In the modifications shown in FIGS. 3B through 3D, defining a clearance with respect to a sit plane is advantageous in releasing heat from the interior of a projector. The leg portion 300 is not provided to compensate for a step portion, as shown in FIG. 6. Accordingly, the leg portion 300 has a small height, and does not affect stability of a projector. An arrangement that a projection amount of the leg portion 300 is varied by turning the leg portion 300 enables to adjust a tilt of a projector main body. This arrangement is advantageous in adjusting the position of a projected image on a screen. As described above, in this embodiment, the projector can be stably sit when being sit on the table.

Setting the bottom surface of the casing 100 in flush with the bottom surface of the cover member 250 enables to make the bottom surface of the projector flat, which is advantageous in enhancing the appearance of the projector.

Second Embodiment

Figure 4:
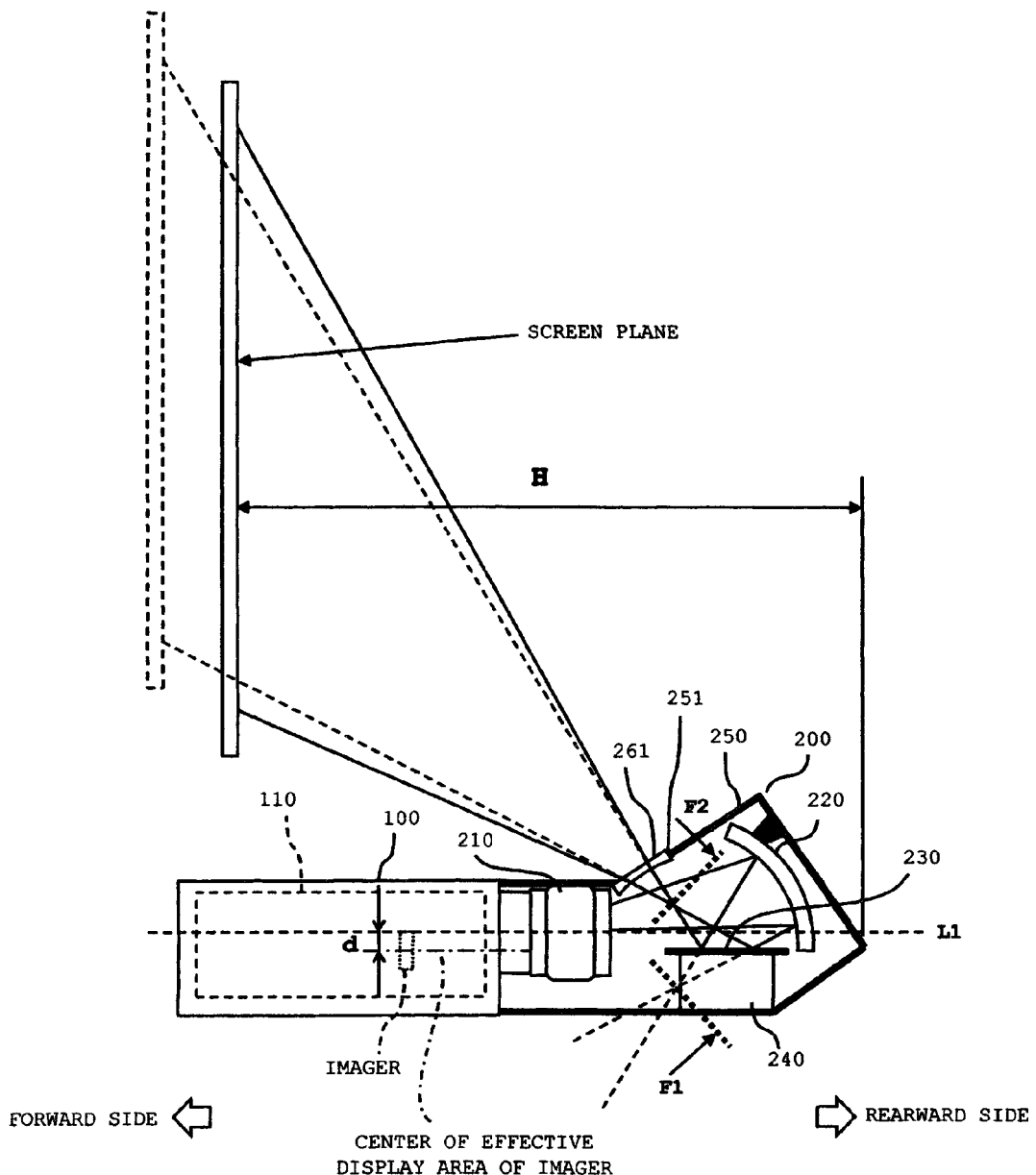
FIG. 4 is a diagram showing an arrangement of a projector in accordance with a second embodiment of the invention.

FIG. 4 is a diagram showing an arrangement of a projector in accordance with the second embodiment.

In the projector of the second embodiment, the optical characteristic of a first refracting optical system, the shape of a reflecting surface of a first reflection mirror 220, the positions of the first reflection mirror 220 and a second reflection mirror 230, and a like condition are defined in such a manner that a convergence plane F2 (position where the cross section of a light flux is minimized) of modulated image light reflected on the second reflection mirror 230 is defined in the interior of a cover member 250. Also, a concave lens 261 having a negative optical power is disposed at a window 251. The concave lens 261 is disposed on the side of a screen plane with respect to the convergence plane F2 of modulated image light. The arrangement of the second embodiment other than the above is substantially the same as the corresponding arrangement of the first embodiment.

In the arrangement of the second embodiment, modulated image light reflected on the second reflection mirror 230 is diverged after converged, then incident onto the concave lens 261 in a diverged stete, and further diverged by the lens function of the concave lens 261. This enables to shorten the distance (throw distance) H from the projector to the screen plane, as compared with the first embodiment.

In this embodiment, the concave lens 261 is disposed at the window 251. Accordingly, the concave lens 261 is also functioned as a protection filter to prevent intrusion of dusts and the like into the cover member 250.

In the case where a flat concave lens as shown in FIG. 4 is used as the concave lens 261, locating a flat surface of the flat concave lens on the exterior of the projector is preferred in the aspect of preventing intrusion of dusts, and maintenance service.

FIG. 4 illustrates the entirety of the concave lens to simplify the description. Actually, however, the concave lens may have any shape depending on a required area (area where modulated image light is actually transmitted) of the concave lens.

Third Embodiment

Figure 5:
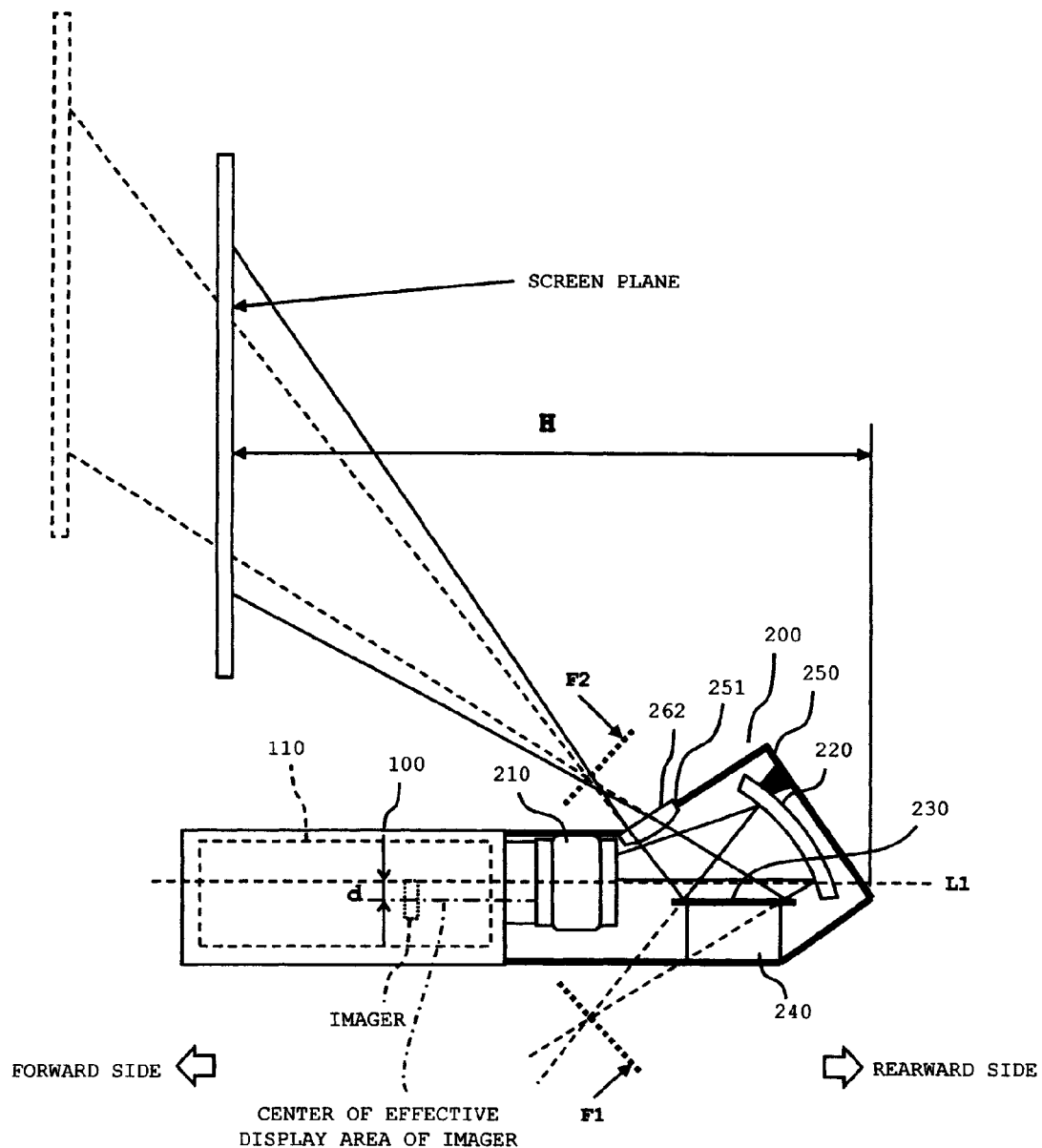
FIG. 5 is a diagram showing an arrangement of a projector in accordance with a third embodiment of the invention.

FIG. 5 is a diagram showing an arrangement of a projector in accordance with the third embodiment. In the projector of the third embodiment, the optical characteristic of a first refracting optical system, the shape of a reflecting surface of a first reflection mirror 220, the positions of the first reflection mirror 220 and a second reflection mirror 230, and a like condition are defined in such a manner that a convergence plane F2 on which modulated image light reflected on the second reflection mirror 230 is converged is defined at the exterior of a cover member 250. Also, a convex lens 262 having a positive optical power is disposed at a window 251. The convex lens 262 is disposed on the side of the second reflection mirror 230 with respect to the convergence plane F2 of modulated image light. The arrangement of the third embodiment other than the above is substantially the same as the corresponding arrangement of the first embodiment.

In the arrangement of the third embodiment, modulated image light reflected on the second reflection mirror 230 is convergently incident onto the convex lens 262 disposed anterior to the convergence plane F2, and further converged by the lens function of the convex lens 262. Thereby, the modulated image light spreads with a wide angle after convergence. This enables to shorten the distance (throw distance) H from the projector to a screen plane, as compared with an arrangement without providing the convex lens 262.

In the third embodiment, the convex lens 262 is disposed at the window 251. Accordingly, the convex lens 262 can also be functioned as a protection filter to prevent intrusion of dusts and the like into the cover member 250.

FIG. 5 illustrates the entirety of the convex lens to simplify the description. Actually, however, the convex lens may have any shape depending on a required area (area where modulated image light is actually transmitted) of the convex lens.

The embodiments of the invention have been described as above, but the invention is not limited to the foregoing embodiments. The embodiments of the invention may be changed or modified in various ways according to needs, as far as such changes and modifications do not depart from the scope of the present invention hereinafter defined.

For instance, the casing 100 and the projection optical system 200 may be covered by a cabinet or a like member.

The second reflection mirror 230 may have a curved shape, an aspherical shape, or a free curve shape, in place of a flat plate-like shape.

What is claimed is:

1. A projection optical system, comprising:
a light exit projection port;
a first refracting optical system having a plurality of lenses with an optical axis;
a first reflecting optical system having a positive optical power and disposed on a side of the light exit projection port with respect to the optical axis of the first refracting optical system to reflect light incident through the first refracting optical system in a direction opposite to the side of the light exit projection port with respect to the optical axis; and
a second reflecting optical system for reflecting the light reflected on the first reflecting optical system toward the light exit projection port.

2. The projection optical system according to claim 1, wherein
the second reflecting optical system is disposed on an optical path from the first reflecting optical system to a position where a cross section of a light flux from the first reflecting optical system is minimized with respect to a convergence plane of the first reflecting optical system.

3. The projection optical system according to claim 2, further comprising:
a second refracting optical system having a negative optical power to transmit the light reflected on the second reflecting optical system, wherein
the second refracting optical system is disposed on a side of a projection plane with respect to a position where a cross section of a light flux from the second reflecting optical system is minimized with respect to a convergence plane of the first reflecting optical system.

4. The projection optical system according to claim 3, further comprising:
a cover member for covering the first refracting optical system, the first reflecting optical system, and the second reflecting optical system, and having the light exit projection port, wherein
the second refracting optical system is disposed at the light exit projection port.

5. The projection optical system according to claim 2, further comprising:
a second refracting optical system having a positive optical power to transmit the light reflected on the second reflecting optical system, wherein
the second refracting optical system is disposed on a side of the second reflecting optical system with respect to a position where a cross section of a light flux from the second reflecting optical system is minimized with respect to a convergence plane of the first reflecting optical system.

6. The projection optical system according to claim 5, further comprising:
a cover member for covering the first refracting optical system, the first reflecting optical system, and the second reflecting optical system, and having the light exit projection port, wherein
the second refracting optical system is disposed at the light exit projection port.

7. The projection optical system according to claim 1, further comprising:
a cover member for covering the first refracting optical system, the first reflecting optical system, and the second reflecting optical system, and having the light exit projection port.

8. A projection display device, comprising:
a projection optical system for enlarging and projecting an image on an imager onto a projection plane,
the projection optical system including:
a light exit projection port
a first refracting optical system having a plurality of lenses with an optical axis;
a first reflecting optical system having a positive optical power and disposed on a side of the light exit projection port with respect to the optical axis of the first refracting optical system to reflect light incident through the first refracting optical system in a direction opposite to the side of the light exit projection port with respect to the optical axis; and
a second reflecting optical system for reflecting the light reflected on the first reflecting optical system toward the light exit projection port.

9. The projection display device according to claim 8, wherein
the second reflecting optical system is disposed on an optical path from the first reflecting optical system to a position where a cross section of a light flux from the first reflecting optical system is minimized with respect to a convergence plane of the first reflecting optical system.

10. The projection display device according to claim 9, further comprising:
a second refracting optical system having a negative optical power to transmit the light reflected on the second reflecting optical system, wherein
the second refracting optical system is disposed on a side of the projection plane with respect to a position where a cross section of a light flux from the second reflecting optical system is minimized with respect to a convergence plane of the first reflecting optical system.

11. The projection optical system according to claim 10, further comprising:
a cover member for covering the first refracting optical system, the first reflecting optical system, and the second reflecting optical system, and having the light exit projection port, wherein
the second refracting optical system is disposed at the light exit projection port.

12. The projection optical system according to claim 9, further comprising:

a second refracting optical system having a positive optical power to transmit the light reflected on the second reflecting optical system, wherein the second refracting optical system is disposed on a side of the second reflecting optical system with respect to a position where a cross section of a light flux from the second reflecting optical system is minimized with respect to a convergence plane of the first reflecting optical system.

13. The projection optical system according to claim 12, further comprising:

a cover member for covering the first refracting optical system, the first reflecting optical system, and the second reflecting optical system, and having the light exit projection port, wherein the second refracting optical system is disposed at the light exit projection port.

14. The projection optical system according to claim 8, further comprising:

a cover member for covering the first refracting optical system, the first reflecting optical system, and the second reflecting optical system, and having the light exit projection port.

15. A projection optical system, comprising:

a light exit projection port, a first refracting optical system having a plurality of lenses with an optical axis;

a first reflecting optical system having a positive optical power and disposed above the optical axis of the first refracting optical system to reflect light incident through the first refracting optical system to an opposite side of the optical axis and in a direction below the light exit projection port; and a second reflecting optical system for reflecting the light reflected on the first reflecting optical system toward the light exit projection port, wherein the second reflecting optical system is located above the lower end of the first refracting optical system.

* * * * *